Figure 1:
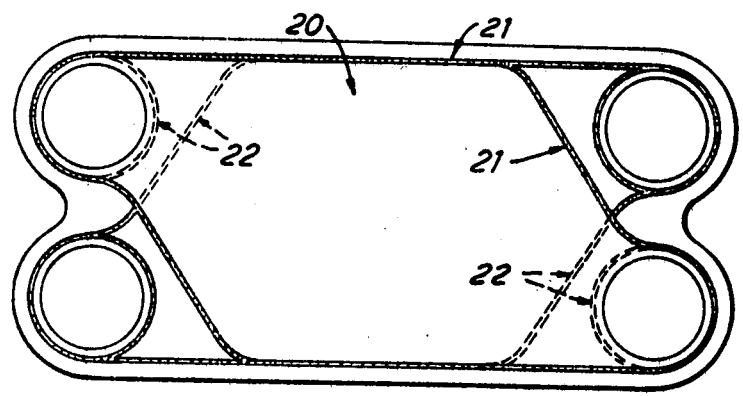

United States Patent [19]

Atkinson et al.

[11] 4,435,235

[45] Mar. 6, 1984

[54] GASKET MANUFACTURE

[75] Inventors: Alan W. Atkinson, Rochdale; Janet M. Lancaster, Dearnley, both of England

[73] Assignee: T&N Materials Research Limited, Manchester, England

[21] Appl. No.: 321,231

[22] Filed: Dec. 22, 1981

[30] Foreign Application Priority Data

Nov. 15, 1980 [GB] United Kingdom ............... 8036727

[51] Int. Cl.³ .................. B32B 17/00; B29C 19/00; D04H 1/16; F02F 11/00
[52] U.S. Cl. ................................. 156/62.2; 156/62.8; 156/245; 264/113; 264/517; 277/235 R
[58] Field of Search ............... 156/242, 245, 276, 312, 156/267, 62.2, 62.8; 428/244, 65; 277/235 R, 235 B; 285/335; 113/80 R; 264/112, 319, 113, 120, 517, 516, 536

[56] References Cited

U.S. PATENT DOCUMENTS

| | | | |
|---|---|---|---|
| 3,492,197 | 1/1970 | Olstowski | 156/312 |
| 3,738,901 | 6/1973 | Matsushima et al. | 156/62.2 |
| 3,793,125 | 2/1974 | Kunz | 156/62.2 |
| 4,333,975 | 6/1982 | Booth | 428/65 |

FOREIGN PATENT DOCUMENTS

| | | | |
|---|---|---|---|
| 30843 | 6/1981 | European Pat. Off. | |
| 52-2817 | 1/1977 | Japan | 264/112 |

Primary Examiner—Edward C. Kimlin
Assistant Examiner—Louis Falasco
Attorney, Agent, or Firm—Cushman, Darby & Cushman

[57] ABSTRACT

A method of manufacturing an expanded graphite gasket comprises the steps of taking co-operating male and female mould members, the female mould member comprising a channel extending through a block from one face to a directly opposite face, the channel as seen in plan having a width and configuration corresponding to a desired gasket shape, presenting a substrate to one face of said block with said channel in register with said locations, filling the channel with a charge of expanded graphite particles, followed by pressing the charge with the male mould member onto the substrate to form a gasket thereon and thereafter removing the mould members.

6 Claims, 5 Drawing Figures

GASKET MANUFACTURE

This invention relates to the manufacture of gaskets from expanded graphite. It is particularly relevant to the manufacture of flat gaskets for automotive and petrochemical applications.

Hitherto, some such gaskets have been moulded directly from elastomeric or polymeric materials. Gaskets have also been blanked out of sheet materials, for example from papers and/or sheets of fibre-reinforced jointing materials, with or without some form of metallic core. Yet other gaskets have been made by printing settable liquid compositions onto metallic or composite substrates.

In order to obtain enhanced chemical and thermal resistance, it has been proposed to use foils or sheets made from expanded graphite, but only at considerable cost because of the high labour content and cutting waste involved in building up a complete gasket by cutting or punching, followed by laminating to attain both the desired shape and thickness. Also, graphite foil is a relatively fragile material, so that handling problems are encountered.

In its broadest aspect the present invention provides a method of manufacturing an expanded graphite gasket comprising the steps of taking co-operating male and female mould members, the female mould member comprising a channel extending through a block from one face to a directly opposite face, the channel as seen in plan having a width and configuration corresponding to a desired gasket shape, filling the channel with a charge of expanded graphite particles presenting a substrate to one face of said block with said channel in register with said locations, filling the channel with a charge of expanded graphite particles, followed by pressing the charge with the male mould member onto the substrate to form a gasket thereon and thereafter removing the mould members.

The faces of the block are preferably parallel; the method preferably includes the step of pre-treating the substrate with adhesive in the location or locations where a gasket is desired.

As only relatively low pressures are needed to convert loose expanded graphite particles into compacted, fully coherent graphite foils, the female mould member can be made of inexpensive materials such as plywood or aluminium. The male member can be made of aluminium, mild steel or reinforced plastics, for example.

Expanded graphite particles are normally supplied at a bulk density of about 4 to 6 g/liter. It has been found advantageous to increase this to about 10 to 40 g/liter, by means of a preliminary treatment. Pre-treatment by subjecting the graphite to a milling operation for example, has the effect of breaking up the original vermiform particles so that they pack together more readily, exhibiting the desired increased bulk density.

They also flow more readily into the corners of a mould; the increased bulk density thus enables the use of a shallower mould for a given quantity of graphite.

The method of the invention therefore preferably includes a preliminary step of pre-treating the expanded graphite particles to increase their bulk density.

The pressing edge of the male mould member can be flat to produce a flat gasket of constant thickness and density, or it may be contoured to give a gasket of correspondingly contoured density/thickness. This may be necessary to meet particular sealing requirements.

The depth of the channel must be great enough to accommodate the charge of particles of expanded graphite. The density change on compaction is of the order of from 4 to 40 to a compacted density of 700 to 1500 or more so that a fairly large volume of particles is needed to make even a relatively thin gasket. (The above figures are in gm/liter.)

The charge of particles may be a single charge, or successive charges may be used in order to build up a desired density and/or thickness profile for the gasket. Where successive charges are used, the first charge must not be fully compacted, or the second charge may not adequately adhere to it. This applies equally to the use of three or more successive charges, of course.

According to a particularly preferred feature of the invention, the pretreatment of the substrate with adhesive is only carried out where a gasket is actually needed. Untreated portions may be left where it is desired to have no gasket or to facilitate removal of a piece of the gasket. This is useful where several otherwise identical substrates are distinguished by a slightly different gasket layout comprising parts only of the same common channel disposition. One mould can be used for all the plates in a set of heat exchanger plates, for example, if the pretreatment with adhesive is correctly applied to each plate so as to enable all undesired gasket portions to be cut away after pressing.

According to another embodiment of the invention the apparatus just mentioned is used to produce a two-sided gasket by a slightly different method. Instead of using a flat sheet substrate applied to one face of the block, a "skeleton" substrate is prepared as a sliding fit in the channel. The substrate is, in plan view the same shape as the desired gasket. The block is placed on a flat support and the half of the total charge of powder is put into the channel. The substrate is then put on top of the half charge of powder and the rest of the charge is put into the channel on top of the substrate. A single pressing operation is then used to form a graphite gasket in situ on both sides of the substrate. The advantage of this method lies in the fact that no finishing operations are needed. The product is a two-sided, self-supporting graphite gasket with a central reinforcing core and there is practically no waste. This is particularly true for relatively complex shapes which could not previously be made without substantial cutting waste.

The same method can be used with a single charge of particles to form a graphite gasket on only one side of the substrate.

In order that the invention be better understood, embodiments of it will now be briefly described with reference to FIGS. 1, 2, 3, 4 and 5. These figures are, respectively, a plan view of a corrugated heat exchanger plate, a perspective view, partly in section, of co-operating male and female mould members, a perspective view of the male mould member of FIG. 2, a schematic cross-sectional side view of parts of the tooling prior to pressing a gasket in accordance with the invention and a schematic cross-sectional side view of parts of the tooling prior to pressing a gasket by the slightly different method referred to above.

Figure 2:
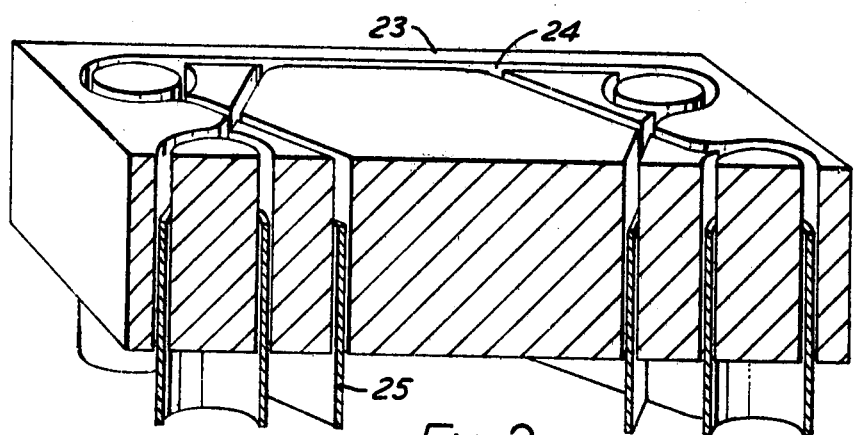
Figure 3:
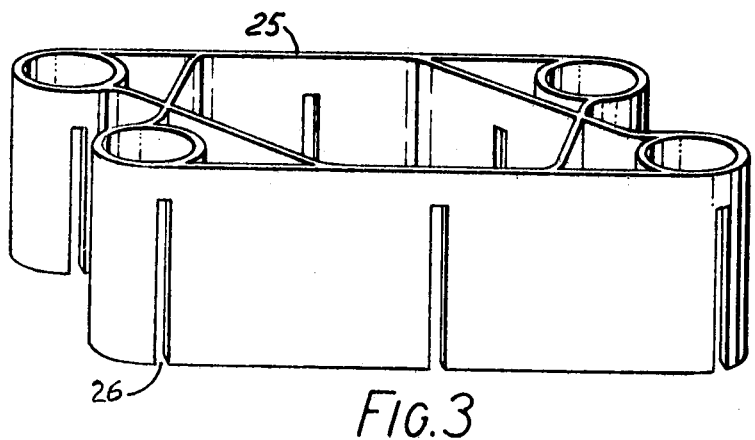
Figure 4:
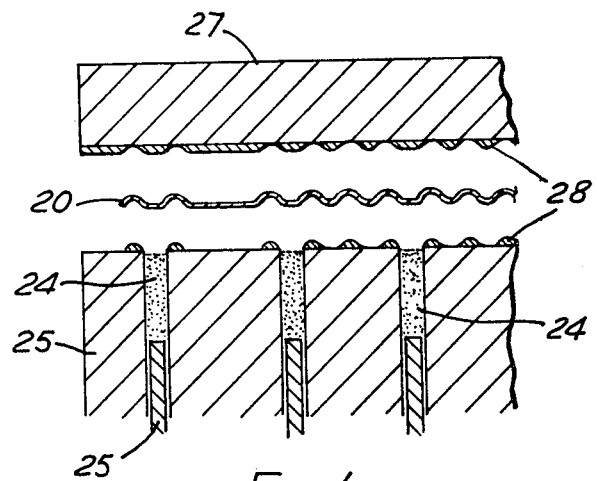

FIG. 1 shows a plate 20 having an expanded graphite gasket 21 on one face. The gasket portions 22 shown by dashed lines were removed after pressing, as will be described later. FIG. 2 shows a solid block female mould member 23, having a slot (or channel) 24 corresponding in plan to the gasket outline of FIG. 1 machined through it. The otherwise detached island portions are located by dowel pins (not shown), around which a male mould member 25 (see also FIG. 3) with slots 26 slides. Referring to FIG. 4, parts of the block mould member 23, the male mould member 25 and the plate 20 are shown, the spacing between the plate and the block being greatly increased, for purposes of illustration. Also shown in FIG. 4 is a back-up tool 27 which has a profiled surface 28 moulded from thermoset resin to match the profile of the plate 20. The back up tool is used to reinforce/support the plate during the pressing of a gasket. Although not shown in FIG. 2, the upper, plate-contacting surface of the block 23 has a moulded thermoset profile (28 in FIG. 4) on it; this is also to support/reinforce the plate during pressing, because it is important to avoid plate distortion or damage. In the case of a completely flat plate of course, such moulded profiles would not be needed.

The slot (or channel) 24 is shown filled with loose expanded graphite particles.

In operation, the plate is pretreated with adhesive in those areas where a gasket is required. In FIG. 1, these areas are where the gasket 21 is located; the areas 22 bounded by dashed lines would be left untreated. Prior to clamping the block mould, the plate and the back up tool together, the slot or channel is filled with a charge of expanded graphite particles and the male mould member is used to press the particles into a gasket of the desired thickness and density. The plate is thereafter removed and the gasket formed in situ on it is trimmed, by removal of the unwanted portions in the areas 22.

To illustrate the utility of the invention in this context, a heat exchanger plate required a graphite seal 65 mm wide by 50 mm thick. Using manual methods to make it, by successive cutting and lamination, from 7 to 9 individual graphite foil layers were needed. This was wasteful, because of the large amount of off-cuts produced. It was extremely time-consuming. By contrast the method of the invention made the desired gasket directly from about 90 gm of loose expanded graphite particles, with minimal waste.

Figure 5:
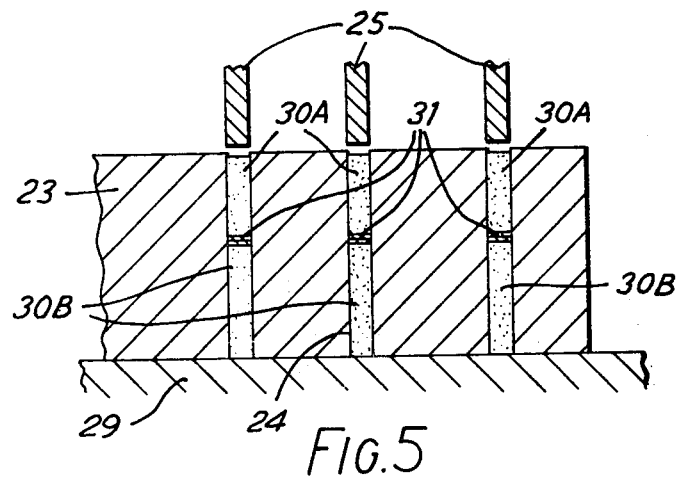

FIG. 5 shows the block mould member 23 supported by a flat, rigid back-up tool 29. The charge of graphite in the slot or channel 24 is in two portions, 30A and 30B respectively, on opposite sides of a "skeleton" substrate 31, which is in the shape of the desired gasket (in plan view) and is also a sliding fit in the slot or channel. (Because of the flat rigid back-up tool 29 it is not of course necessary to locate the detached island portions by dowel pins; they could be mounted to the tool 29). Pressing is carried out as before but in this case the gasket is formed on opposite sides of the substrate 31, which is preferably adhesive-treated prior to insertion in the slot or channel 24.

What we claim is:

1. A method of making a flat gasket directly from expanded graphite particles, the method comprising the steps of:
    (1) providing co-operating male and female mould members, the female mould member being in the form of a channel extending through a block from one face to a directly opposite face, the channel as seen in plan having a width and configuration corresponding to a desired gasket shape,
    (2) placing a flat, rigid back-up tool in contact with one of said faces,
    (3) introducing a charge of graphite particles into said channel,
    (4) placing a gasket substrate into said channel,
    (5) introducing a second charge of graphite particles into the channel, followed by
    (6) applying the male mould member and pressing both charges and the substrate against the back-up tool to form a graphite gasket in situ on both sides of the substrate.

2. The method of claim 1 including the preliminary step of forming the substrate in the shape of the desired gasket, in plan view as a sliding fit for said channel.

3. The method of claim 1 including the step of pretreating the substrate with adhesive in all those locations where it is desired to form a gasket in situ thereon.

4. The method of any preceding claim including the further step of removing from the substrate any unwanted gasket portions thereon.

5. The method of claim 1 including a further step of pre-treating the expanded graphite particles to increase their bulk density.

6. The method of claim 5 wherein the particles are milled to increase their bulk density from about 4 to 6 g/liter to about 10 to 40 g/liter.

* * * * *